Nov. 21, 1967  G. J. PHILIPPI  3,353,432
PRESSURE-SENSITIVE TAPE FEEDING DEVICE
Filed April 19, 1966  5 Sheets-Sheet 4
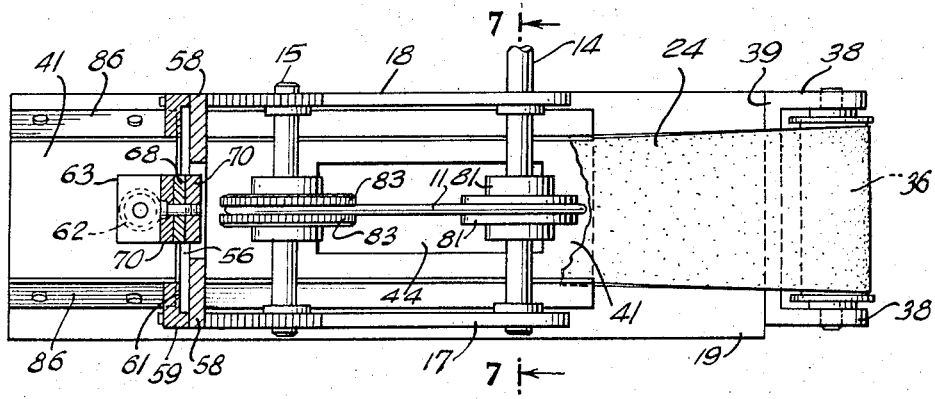
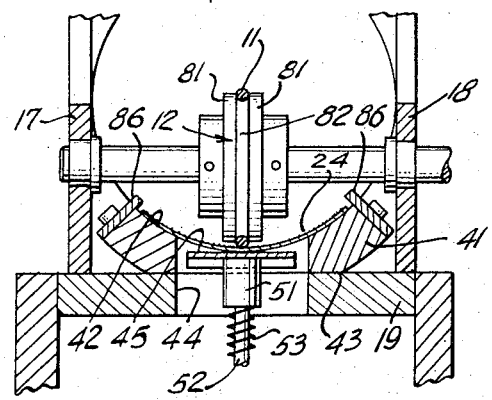
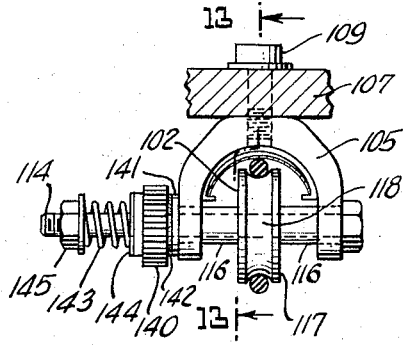
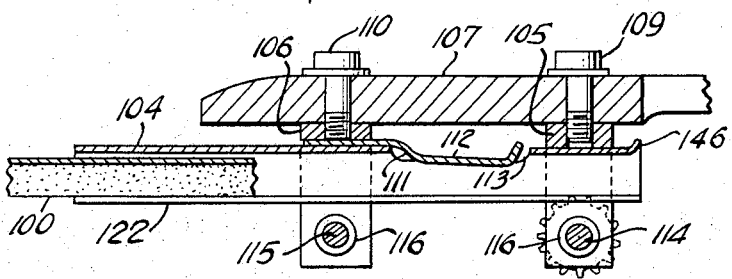
INVENTOR.
GEORGE J. PHILIPPI
BY Charles A. Harris
ATTORNEY

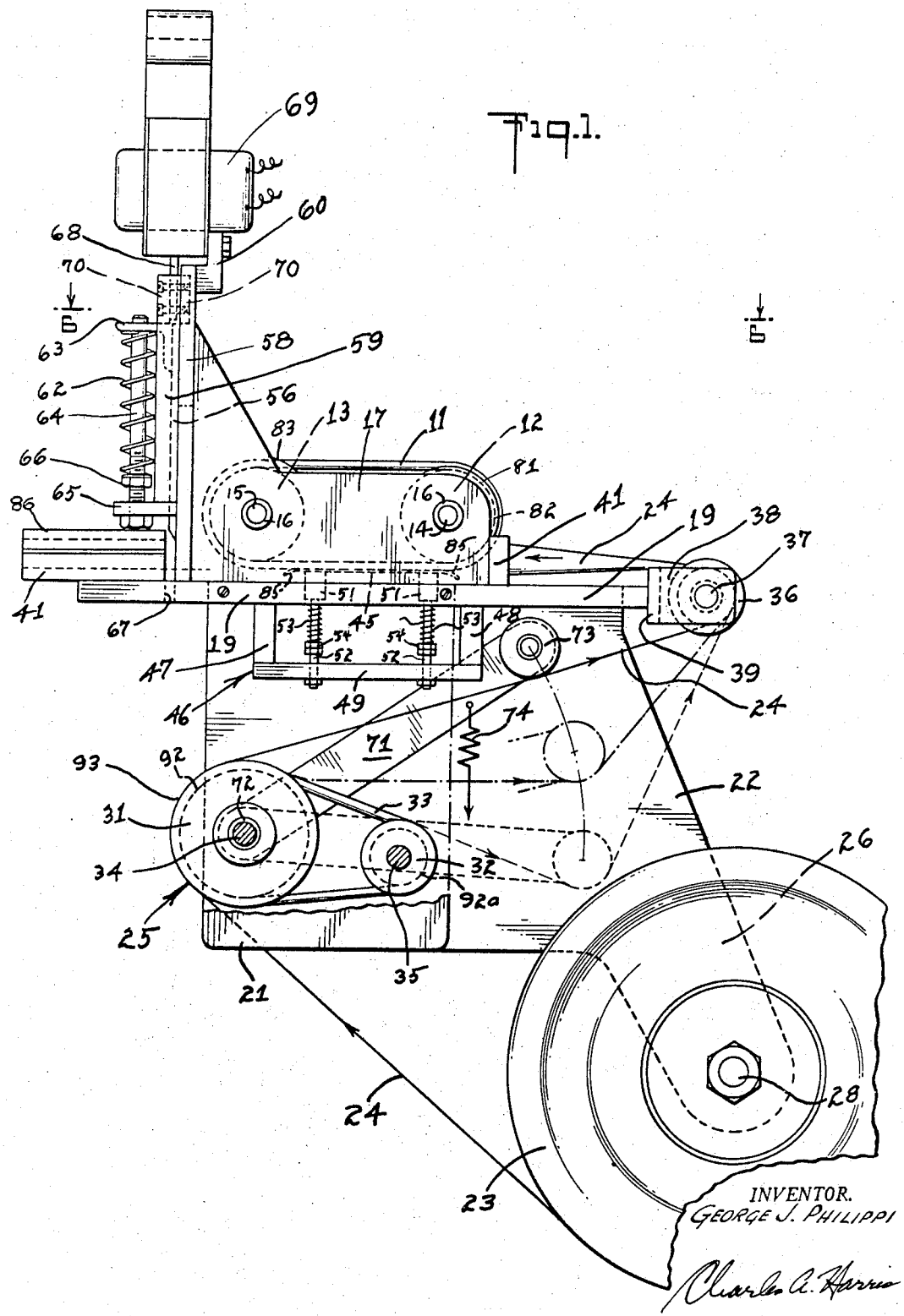

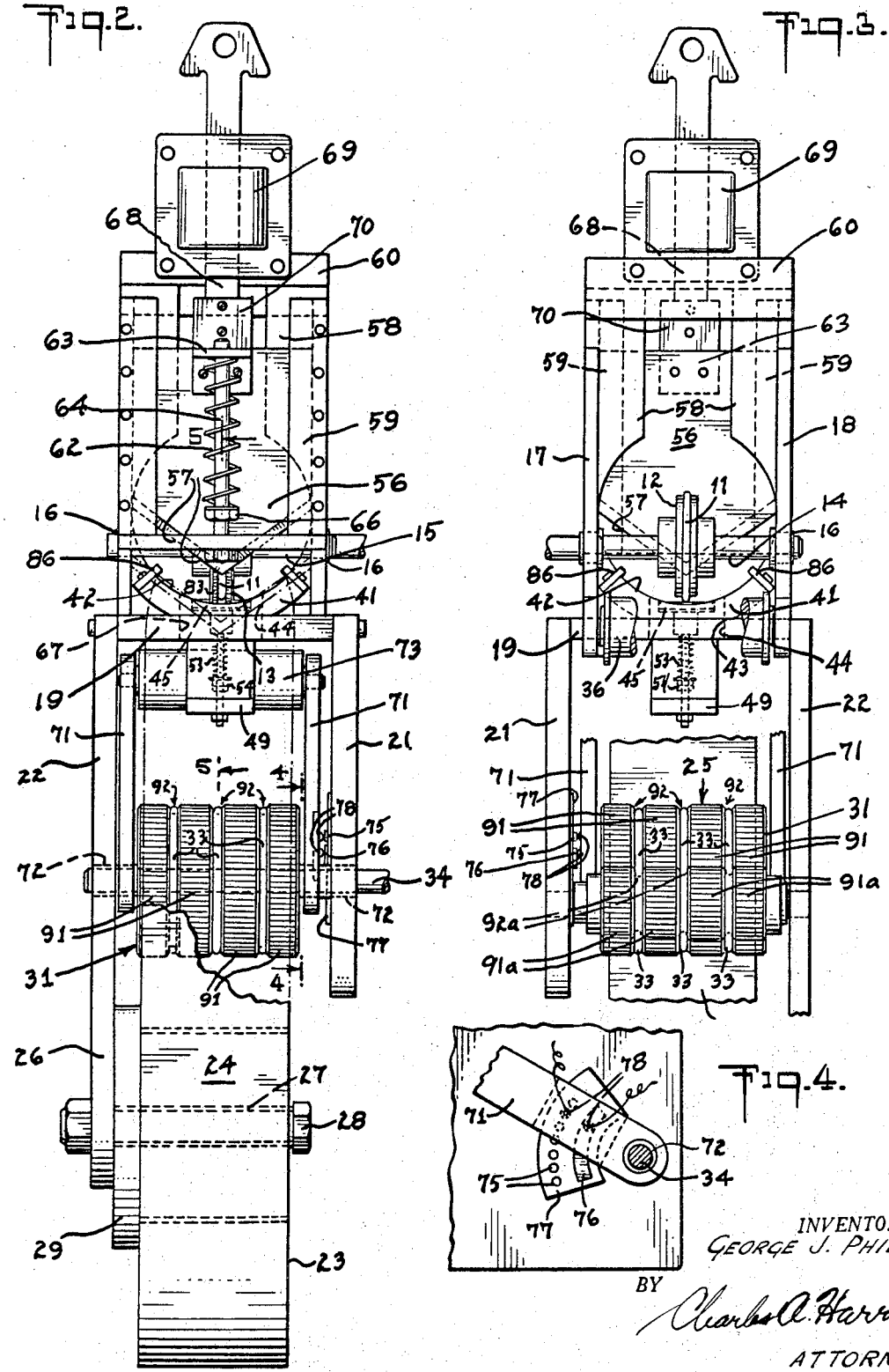

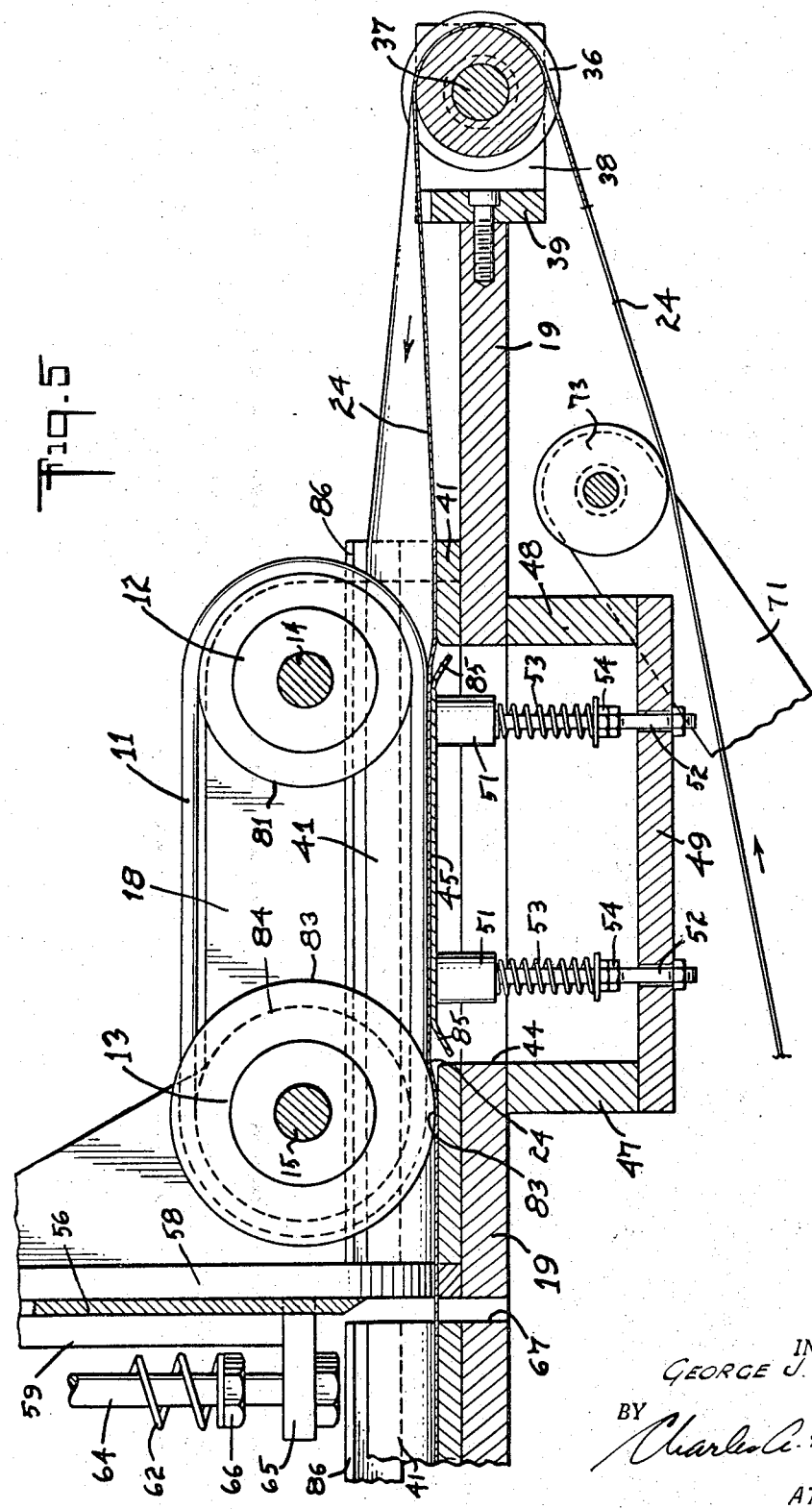

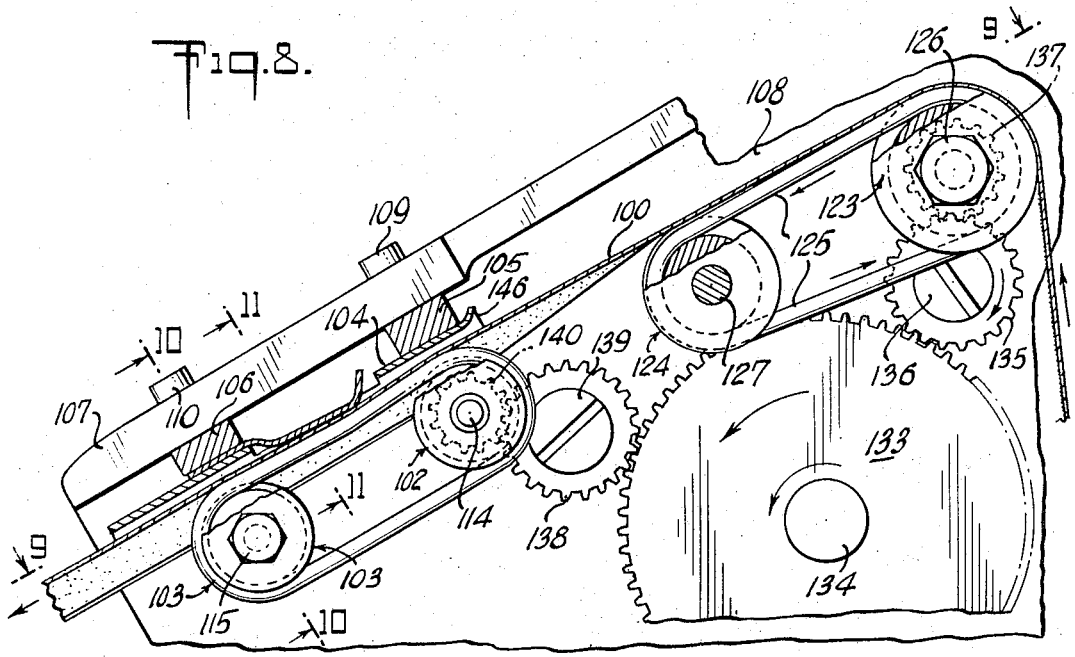
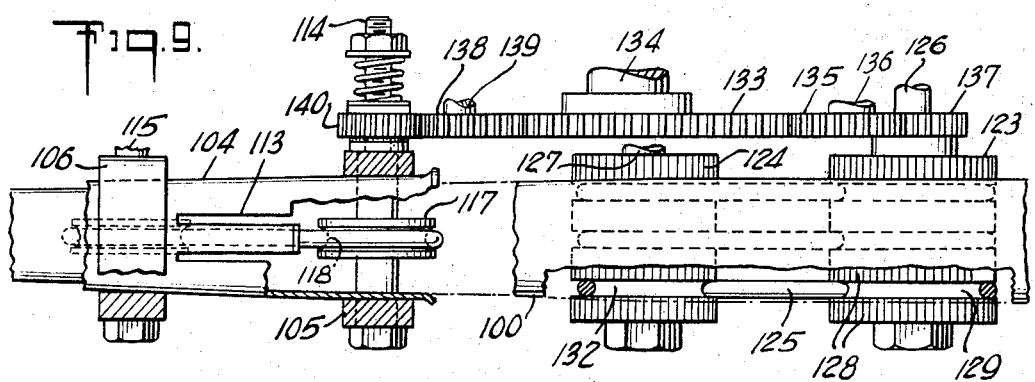
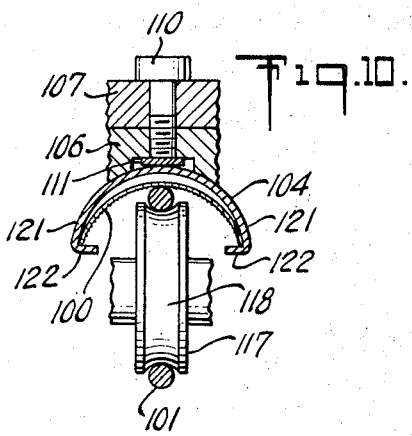
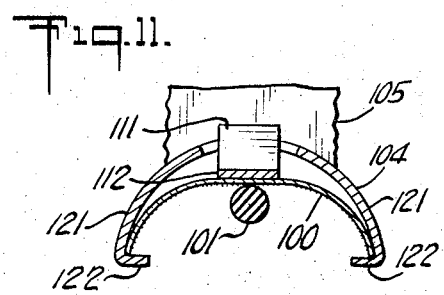

United States Patent Office

3,353,432
Patented Nov. 21, 1967

3,353,432
PRESSURE-SENSITIVE TAPE FEEDING DEVICE
George J. Philippi, Plainfield, N.J., assignor to Johnson & Johnson, a corporation of New Jersey
Filed Apr. 19, 1966, Ser. No. 543,662
20 Claims. (Cl. 83—176)

This application is a continuation-in-part of my copending application Ser. No. 297,829 filed July 26, 1963.

The present invention relates to feeding devices for pressure-sensitive adhesive tape and other strip material, more particularly to devices designed to feed or push out a free end of such a strip for use.

Pressure-sensitive adhesive strip in tape form normally comprises a backing sheet which provides strength and supports the adhesive and a layer of pressure-sensitive adhesive on one side of the backing. A primer layer, or layers, may be included between the backing and the adhesive and a nontacky release coating or backsize may be applied to the other side of the backing to facilitate unrolling the strip. Thus the adhesive side of the strip is pressure-sensitive and tacky, and will stick to a surface to which it is applied while the other side of the strip is nontacky and capable of sliding along a guide surface.

Attempts have been made to feed such material by advancing a free end of the strip by means of a feed roll of some kind in contact with the tacky side of the strip. These devices have not been satisfactory because no adequate means has been devised for preventing the strip from remaining adhered to the feed roll and wrapping around the roll or otherwise fouling up the machine. It has been suggested to remove the strip from the feed roll by means of a pull roll running at a higher peripheral speed than the feed roll. This technique roughens or destroys the continuity of the adhesive surface and is not at all suitable for feeding extensible tapes.

According to the present invention, a feeding device is provided for advancing the free end of a pressure-sensitive adhesive strip of the above type, cantilever fashion, regardless of the extensibility or stiffness of the strip, and without stretching the strip or roughing up the surface of the adhesive layer. This device positively feeds the free end of the strip without danger of the strip adhering to the device after it is intended to be released therefrom or in any other way fouling up the operation of the device.

The feeding device of this invention comprises a continuous feeding surface adapted to advance a pressure-sensitive adhesive strip by contact with its adhesive side, and guide means which cooperates with the feeding surface to give the strip a three dimensional transverse cross-section which imparts rigidity to the strip for feeding it cantilever fashion away from the device. The feeding surface is adapted to advance the strip while adhering only lightly to the adhesive side thereof so that the feeding surface may be separated from the strip without retarding the forward movement of the strip or necessitating the application of tension thereto. Preferably the feeding surface, or means, is adapted to progressively adhere to a narrow longitudinal contact area of the adhesive side of the strip, and this longitudinal contact area extends lengthwise of the strip for an appreciable distance and is centrally located transversely of the strip. This normally provides contact between the feeding means and the adhesive side of the strip only along the center line of the strip where the longitudinal contact area is located. Thus, even though there is hardly more than point contact between the feeding means and the strip at any given point in the travel of the strip, the length of the narrow contact area provides sufficient engagement between the surface of the feeding means and the strip to impart the desired driving force to the strip. As a result, the strip can be separated very easily from the surface of the feeding means without in any way retarding its forward movement. This may be accomplished by stripping means which may be associated with the feeding means or separate therefrom as will be described more fully hereinafter. Under some circumstances sufficient rigidity may be imparted to the strip, itself, to allow the surface of the feeding means to be separated therefrom without the need for specific stripping means to prevent the strip from wrapping around the feeding means.

As mentioned above, guide means is associated with feeding means for imparting the desired three dimensional cross-section to the strip and give it the desired rigidity for feeding purposes. This guide means normally is in the form of a track which extends longitudinally of the strip and the feeding means so that the feeding means runs within the track. This track comprises opposed side guide portions located transversely outwardly of the feeding means and displaced in the direction of the feeding means away from the normal plane of contact between the strip and the feeding means. This guides the strip on each side of the feeding means and causes the strip to assume a three dimensional transverse cross-section. The longitudinal contact area between the strip and the feeding means, in a sense, acts as an axis about which the strip is shaped by virtue of its contact with the feeding means and the opposed side guide portions of the track in this embodiment of the invention.

Preferably, the feeding means is in the form of a continuous belt driven longitudinally, i.e., in the direction of movement of the strip, in a closed path, and the strip is brought into adhering contact with the outer surface of the belt so that forward movement of the belt advances the strip. As indicated above, the belt preferably presents a narrow longitudinal line of contact for feeding the strip to minimize contact with the adhesive surface of the strip, both to avoid damaging the adhesive surface and to facilitate removing the strip from the belt. This is readily accomplished by utilizing a small diameter belt having a circular cross-section. Preferably, also, the belt is formed from a resilient material such as rubber so that it may cooperate with resilient means extending through the track on the other side of the strip for assuring firm engagement between the strip and the belt. It also is preferred that the resilient belt be formed from a material such as silicone rubber which possesses a low tendency to adhere to the tacky adhesive surface of the strip.

Preferably, the belt passes over first and second pulleys which are spaced from one another and at least one of the pulleys is driven through its shaft to drive the belt. The belt is sufficiently free of the structure of the first pulley that the strip may be brought into adhering contact with the belt as it passes around the first pulley. In one form of the invention wherein stripping means is associated with the feeding means, the second pulley comprises spaced stripping flanges which define a groove between them for receiving the belt and the belt is recessed radially inwardly of the peripheries of the flanges. Thus, as the strip is advanced toward the second pulley in adherence with the belt, it is brought into contact with the peripheral stripping surfaces of the flanges on the second pulley and led by these surfaces outwardly of the path of the belt, until it is stripped from the belt. The strip is removed from the belt in this manner without adhering to the periphery of the stripping flanges and the flanges do not apply tension to the strip or retard its forward movement. Thus, the free end of the strip is advanced or fed forward by the force imparted to it by the belt. The peripheral surfaces of the stripping flanges present relatively small areas for contacting the strip to assure that they will not adhere to the strip. For this reason, the stripping flanges normally are axially thin and preferably are serrated, knurled, or otherwise shaped to present intermittent contact areas to the strip. Additionally, it is preferred that the aforesaid belt and flange surfaces which contact the strip and the forces which bring the strip into contact with the belt be balanced to assure that the strip will be separated from the belt by the flanges without adhering to the flanges.

The stripping means for separating the strip from the feeding means may be associated with the guide track. For instance, the guide track may include edge guide portions in the form of guide rails on each side of the feeding means for guiding the longitudinal edges of the strip after the strip has assumed its three dimensional cross-section, and the edge guides may be designed to retain the edges of the strip against other than longitudinal displacement with respect to the track, thereby assuring that the strip retains its three dimensional transverse cross-section as long as it is guided by the track. These edge guides are arranged parallel to the longitudinal contact area between the feeding means and the strip and extend beyond the feeding means so that they guide the edges of the strip away from the feeding means without allowing the strip to bend or vary from its desired three dimensional transverse cross-section. Of course, this can only be accomplished if the feeding means is not adhered too strongly to the adhesive side of the strip, since the rigidity of the strip depends primarily only upon its three dimensional transverse cross-section.

As indicated above, the feeding means preferably is in the form of a continuous belt driven longitudinally in a closed path and the guiding means preferably is in the form of a track. Similarly, the guiding means preferably is in the form of a track which presents concave arcuate surface portions facing the belt and edge guide portions or rails on both sides of the belt. In this case, the strip runs in the track with its edges guided by the rails and is caused to assume a curved concave cross-section which increases its rigidity and facilitates feeding of the strip. The track, itself, extends beyond the feeding means so that the strip is guided away from the feeding means and advanced or projected from the feeding device cantilever fashion, whereby its three dimensional transverse cross-section gives it rigidity and facilitates application of the strip to an article.

Preferably, the feeding device of this invention includes pulling means in the path of the strip ahead of the feeding means for unwinding the strip or pulling it from a supply roll, or the like, and for normally advancing the strip toward the feeding means at substantially the same linear speed as the outer surface of the feeding means. This preferably is accomplished by regulating the relative linear speed of the feeding means with respect to the pulling means for taking up any slack in the strip between the feeding means and the pulling means while applying only limited tension to the strip between the feeding means and the pulling means. This may be done by driving the feeding means at a higher linear speed than the pulling means when the strip becomes slack between the feeding means and the pulling means and then at the same linear speed as that of the pulling means when the slack is taken up. Regulating means responsive to the tension in the strip between the feeding means and the pulling means may be used for this purpose. In one embodiment of this invention, this regulating means is in the form of a slip clutch on the drive to the feeding means, in which case the feeding means would be geared to be driven faster than the pulling means and the clutch would be adapted to slip to allow the feeding means to be driven at the same linear speed as the pulling means when a given limited tension is applied to the strip between the pulling means and the feeding means. In another embodiment of the invention, the regulating means is in the form of a floating lever or a similar device directly responsive to slack in the strip between the pulling means and the feeding means which, in turn, would reduce the speed of the pulling means to allow the feeding means to remove the slack. When the slack is removed, the pulling means and the feeding means would operate at the same linear speed.

Other and further advantages of this invention will appear to one skilled in the art from the following description and claims taken together with the drawings wherein:

FIG. 1 is a schematic view in elevation of a feeding device according to a preferred embodiment of this invention, partly broken away to show the pulling rolls more clearly.

FIG. 2 is a partly broken away front end view of the feeding device of FIG. 1.

FIG. 3 is a partly broken away rear end view of the feeding device of FIG. 1.

FIG. 4 is an enlarged view of the control switch for driving the pulling rolls of the preceding figures.

FIG. 5 is an enlarged view partly in longitudinal section and partly in elevation of the feeding portion of the device of the preceding figures.

FIG. 6 is a top view partly in section and partly in plan of the device of FIG. 1.

FIG. 7 is a somewhat enlarged view partly in section and partly in elevation taken along the line 7—7 of FIG. 6.

FIG. 8 is a view partly in elevation and partly in section of a somewhat different embodiment of this invention.

FIG. 9 is a view partly in plan and partly in section taken from the line 9—9 of FIG. 8.

FIG. 10 is a slightly enlarged view partly in section and partly in elevation taken along the line 10—10 of FIG. 8.

FIG. 11 is a more greatly enlarged view partly in section and partly in elevation taken along the line 11—11 of FIG. 8.

FIG. 12 is another view partly in section and partly in elevation taken along a plane passing through the axis of shaft 114, and through the axis of bolt 109.

FIG. 13 is a view partly in section and partly in elevation taken along the line 13—13 of FIG. 12.

Referring to FIGS. 1–7 of the drawings, there is shown one embodiment of a feeding device according to this invention which comprises a feeding member in the form of a continuous feeding belt 11 passing around a first pulley 12 and a second pulley 13 which are spaced from one another and fixed to first and second shafts 14 and 15, respectively, which in turn are rotatably mounted in bushings 16 located in a near side plate 17 and a far side plate 18. The slide plates are spaced to accommodate the pulleys 12 and 13 and the pulley shafts 14 and 15 and are supported by a base plate or table 19 which may be mounted on suitable framework, not shown.

A near side wall 21 and a far side wall 22 depend from opposite sides of the table 19 for supporting a supply roll 23 of strip material 24, and a pulling device 25 for advancing the strip 24 from the supply roll 23 to the feeding belt 11. The supply roll 23 is supported cantilever fashion on an arm 26 extending downwardly from the rear of the far side wall 22. The supply roll 23 fits on a sleeve 27 rotatably carried on a stub shaft 28 bolted to the arm 26. A spacer plate 29, fitting over the shaft 28, is provided for aligning the supply roll 23 transversely in the machine. The pulling device 25 comprises a first relatively large pulling roll 31, a second smaller roll 32, and a set of three continuous stripping belts 33 passing around the first and second rolls. The rolls 31 and 32 are positioned on shafts 34 and 35, respectively, which, in turn, are mounted for rotation in the near and far side walls 21 and 22.

The strip 24 is led from the pulling device 25 to the feeding belt 11 over a guide roll 36 mounted for rotation on a transverse shaft 37 journaled in side walls 38 of a C-shaped bracket 39 bolted to the end of the table 19.

A guide track 41 for guiding the strip 24 under the feeding belt 11 and then away from the belt beyond the second pulley 13 is positioned on the table 19 under the belt. The guide track 41 is in the form of a curved plate or pipe section with its concave side facing the belt 11 to provide a curved concave guiding surface 42 for the strip 24 and with its convex side facing the table 19. A portion 43 of the convex side of the track 41 along the center line of the device is flattened to allow the track to be firmly mounted on the table 19. The bottom of the track 41 and the table 19 are cut out under the belt to provide an opening 44 for receiving a presser foot 45 which is yieldably and adjustably mounted inside a presser housing 46 depending from the table 19 for pressing the strip 24 into contact with the underside of the belt 11 as the belt passes around the first pulley 12 and approaches the second pulley 13. The presser housing 46 comprises front and rear walls 47 and 48 depending from the table 19 and a bottom plate 49. The presser foot 45 is mounted on front and rear sleeves 51 which fit over corresponding vertical rods 52 bolted to the bottom plate 49 of the presser housing 46. The sleeve 51, and consequently the presser foot 45, are urged upwardly toward the belt 11 by coil springs 53 positioned on the rods between the sleeves 51 and adjustable collars 54 located on the rods 52 above the bottom of the housing. The position of the presser plate 45 with respect to the belt 11 may be adjusted by varying the position of the adjustable collars 54.

A knife 56 for cutting the strip 24 after it has left the feeding belt 11 is located at the front end of the feeding device in line with the guide track 41. The knife 56 has a V-shaped cutting edge 57, as shown most clearly in FIG. 2, and is mounted in vertical guides formed of upright girders 56 at the sides of the table 19 and L-shaped guide members 59 bolted to the side plates 17 and 18 through the uprights. A relatively heavy L-shaped cross beam 60 connects the girders 58 above the knife. The knife 56, itself, rides in slots 61 formed at each side of the table between the guide members 59 and the uprights 58. The knife is urged upwardly to a normal position above the strip by a return spring 62 which presses upwardly against a horizontal knife bracket 63 attached to the knife. The return spring 62 is fitted over a vertical bolt 64 threaded through a horizontal supporting bracket 65 extending from the uprights 58 just above the guide track 41. The supporting bracket 65 is slotted to allow the knife 56 to pass therethrough and the bolt 64 is adapted to slide vertically through a hole in the knife bracket 63 during movement of the knife with respect to the bolt. The force exerted by the return spring 62 against the knife bracket 63 may be adjusted by varying the position of a nut 66 threaded on the bolt 64 at the bottom of the spring. The guide track 41 is cut out, or recessed, to allow the knife 56 to pass therethrough to sever the strip 24 carried in the track 41 and a corresponding cutout, or recess, 67 is provided in the table 19 underneath the center of the track to accommodate the point of the knife 56 when the knife reaches the lowest point in its travel, shown in dotted lines in FIG. 2. The knife 56 is driven downwardly in its cutting stroke by a drive bar 68 under control of a solenoid 69 bolted to the cross beam 60. The solenoid 69 may be actuated automatically or manually when a given strip length is fed past the second pulley 13. When the solenoid 69 is de-energized, the return spring 62 retracts the knife to the position shown in FIG. 2 where it is ready for its next cutting stroke. A pair of wearing plates 70 are secured by set screws to opposite sides of the bottom end of the drive bar 68 to press downwardly on the top of the knife bracket 63 for depressing the knife 56.

The strip 24 is withdrawn from the supply roll 23 by the pulling device 25 with its adhesive side facing the pulling device and then up and around the guide roll 36 at the rear of the table 19 and toward the feeding belt 11 with its adhesive side facing the feeding belt. The pulling device 25 is driven by control means responsive to the tension in the strip between the feeding belt 11 and the pulling device 25 (more specifically to the tension in the strip between the guide roll 36 and pulling device) to advance the strip 24 toward the belt 11 at the same linear speed as the outer surface of the belt when a given tension is applied to the strip between the pulling device and the belt. The control means for this purpose comprises control arms 71 pivotally mounted on a sleeve 72 fitting over the pulling roll shaft 34 and a follower roll 73 mounted between the free ends of the control arms. The follower roll 73 is urged downwardly against the nontacky side of the strip 24 by a spring 74 toward a lowermost position shown dotted in FIG. 1. A series of contacts 75 and a control segment 76 are mounted on a switch plate 77 located on the inside surface of the near side wall 21 for cooperation with spaced contacts 78 located on the adjacent control arm 71 for varying a conventional control device driving an electric motor, both not shown, connected to the drive shaft 34 for the first pulling roll 31. Thus, the speed of the pulling device 25 is controlled by the position of the control arm 71. In the lowermost (dotted) position of the control arm 71 the pulling device is stopped, whereas in its uppermost position, shown in full in FIG. 1, it is being driven at its full speed to advance the strip 24 at the same linear speed as the outer surface of the feeding belt 11. Each time a length of the strip leaving the feeding belt is to be severed by the knife 56, the forward movement of the feeding belt is stopped. When this occurs, tension is removed from the strip 24 extending between the pulling device 25 and the guide roll 36, allowing the spring 74 to pull the control arm 71 down to its stop position. As the control arm 71 moves downwardly, it gradually slows down the pulling device 25 and finally stops it in the lowermost position of the arm. Thus, when the feeding belt 11 again is actuated to advance the strip 24, it first will pull the slack out of the strip between the guide roll 36 and the pulling device 25. As it does so, it will start the pulling device 25 and gradually bring it up to full speed with the arm 71 in the position shown in full in FIG. 1. This assures that the strip material 24 always is available, to be fed by the belt 11 under minimum tension, regardless of the type of strip being fed or the way in which the strip is wound on the supply roll 23. This is particularly important when the strip is to be fed forward by a single narrow belt 11, such as that shown in FIGS. 1–7.

The first pulley 12 presents spaced annular flanges 81 defining an annular groove 82 and the second pulley 13 presents spaced annular stripping flanges 83 defining an annular groove 84 between them for receiving the feeding belt 11. The groove 82 in the first pulley is relatively shallow so that the belt 11 protrudes radially beyond the flanges 81 and its outermost surface is otherwise free of the structure of the first pulley 12. The guide track 41 extends rearwardly of the first pulley so that the strip 24 progressively assumes a curved concave cross-section and enters the track before it contacts the belt 11. The feeding belt 11, itself, is circular in cross-section and presents a narrow line of contact to the adhesive side of the strip 25 advancing toward the belt. The rear end of the presser foot 45 is positioned under the axis of the first pulley 12 and the foot is adjusted so as to press the strip 24 riding in the track 41 lightly upwards against the curved underside of the belt 11 passing around the first pulley 12 so that the belt 11 progressively adheres to the adhesive side of the strip. The top surface of the foot 45 is substantially flat except for front and rear end portions 85 of the foot which are inclined downwardly slightly to avoid snagging on the strip. Thus, the strip 24 along its longitudinal center line is disposed substantially flat both longitudinally and transversely as it is brought into contact with the curved outer surface of the belt 11. The belt 11 preferably is formed of a resilient material such as hard rubber with the result that it distends slightly as the strip 24 is pressed against it. The lowermost portion of the convex outer surface of the feeding belt 11 remains lightly adhered to the adhesive side of the strip 24 as the belt passes from the first pulley 12 to the second pulley 13. Thus, there is a "line of contact" between the belt and the strip which extends along the longitudinal center line of the strip. This "line of contact" actually is a very narrow area whose width is determined in part by the resiliency of the belt and its radius of curvature and in part by the nature of the adhesive and the adjustment of the presser foot 45.

During the time the strip 24 is brought into contact with the belt 11 and fed forward thereby as it passes from the first pulley 12 to the second pulley 13, the belt runs in the track 41 and the nontacky side of the strip slides in contact with the curved concave guiding surface 42 of the track. To assure that the strip is properly positioned and properly centered with respect to the track and the belt, rails 86 are provided on each side of the track in the form of plates extending radially inwardly with respect to the curvature of the track and upwardly toward the pulleys. The rails 86 are spaced to accommodate the strip 24 between them after the strip assumes a curved concave cross-section in contact with the correspondingly curved guiding surface 42 of the track 41. Thus, the rails 86 center the strip with respect to the track 41.

The groove 84 in the second pulley 13 is considerably deeper than the groove 82 in the first pulley 12 so that the belt is fully recessed radially inwardly of the periphery of the stripping flanges 83 on the second pulley 13 and these flanges 83 protrude radially outwardly beyond the belt 11, as shown most clearly in FIGS. 2, 5 and 6. As shown in FIG. 5, as the belt 11 enters the groove 84 between the flanges 83 on the second pulley, the strip 24 adhered thereto is led radially outwardly of the path of the belt 11 by the peripheral surfaces of the flanges 83, thereby separating the strip 24 from the belt 11. Thus, the strip 24 is pushed lightly off the surface of the belt 11 by the flanges 83 on the second pulley and these flanges 83 act as stripping means associated with the feeding means, or belt 11. The perimeters of the flanges 83 have a linear speed at least as great as the outer surface of the belt 11, in fact somewhat greater due to their position radially beyond the surface of the belt, with the result that the second pulley 13 will separate the strip 24 from the belt 11 without adhering to or applying tension to the strip and without retarding the forward movement imparted to the strip by the surface of the belt. The strip 24 then will be fed forward beyond the second pulley 13 by the force imparted to the strip by the belt. During the time the strip is separated from the belt by the second pulley, the nontacky side of the strip 24 remains in contact with the curved concave inner surface 42 of the guide track, and at least one of the side edges of the strip 24 normally contacts one of the rails 86 along the side of the track 41, so that the strip retains its curved concave cross-section as it is fed from the second pulley 13 and into the path of the cutting knife 56. The track 41 extends sufficiently beyond the cutting knife to assure that the portion of the strip severed by the knife which extends beyond the end of the track will be at least partially curved in cross-section to assure that it will possess the desired stiffness or rigidity.

The stripping flanges 83 on the second pulley 13 are axially thin and knurled or interrupted circumferentially so as to present relatively small intermittent surface areas for contacting the strip 24 and separating it from the belt 11 while minimizing contact between the adhesive side of the strip and the stripping flanges.

As indicated hereinbefore, the pulling device shown in FIGS. 1–3 comprises a first relatively large pulling roll 31, a second small roll 32 spaced from the first roll, and a set of three continuous stripping belts 33 passing around the first and second rolls. The shaft 34 for the first pulling roll 31 is driven as described hereinbefore by a motor, not shown, operated by the control arm 71. Each of the three stripping belts 33 is a continuous resilient belt similar to the feeding belt 11 and also is circular in cross-section. The first pulling roll 31 presents a series of four spaced annuar ridges 91 which define between them a set of three annular grooves 92 for receiving the three stripping belts 33. The belts 33 are completely recessed in the grooves 92 radially inwardly of the ridges 91 so that the ridges protrude beyond the outer surfaces of the belts as the belts pass around the first pulling roll 31. The second roll 32 presents a similar series of four spaced ridges 91a defining between them a corresponding set of three grooves 92a for receiving the belts 33 as the belts pass around the roll 32. The adhesive strip 24 is led around a pulling portion or segment 93 of the first pulling roll and the pulling portion 93 of the roll is well within that peripheral portion of the roll wherein the stripping belts 33 are recessed inwardly of the perimeters of the ridges 91. The belts 33 gradually pass radially outwardly of the perimeters of the ridges 91 beyond the pulling portion of the first pull roll as the belts advance toward the second roll 32. The ridges 91 on the first pull roll present sufficient surface areas in the pulling portion 93 of the roll for pulling the strip from the supply roll by applying tension thereto and advancing the strip toward the feeding belt. The circumferential surfaces of the ridges are transversely serrated, or knurled, to provide the desired pulling surfaces, as shown in FIGS. 2 and 3. The strip 24 normally is withdrawn from the pulling portion 93 of the first pull roll 31 by the tension applied to it by the feeding belt 11. As shown in FIG. 1, when the belt 11 is feeding the strip under normal conditions the strip 24 follows roughly a straight-line path between the pulling device 25 and the guide roll 36. Thus, as the strip 24 is withdrawn from the first pull roll 31 in this manner, it is led away from the pulling device at an angle which normaly precludes contact between the strip 24 and the stripping belts 33. However, if the strip 24 adheres strongly to the ridges 91, or for some other reason tends to follow the ridges and wrap around the first pull roll 31, it will come into contact with the stripping belts 33 as these belts pass radially outwardly from the ridges on their way toward the second roll 32 and will be separated from the surfaces of the ridges 91 by the belts. An instance where this condition might occur is shown in dot-dash lines in FIG. 1 wherein the control arm 71 is roughly halfway between its full speed and stop positions.

Another embodiment of a feeding device according to this invention is shown in FIGS. 8–13. In this form of the invention, the feeding means again is in the form of a continuous feeding belt 101 which passes around spaced first and second feeding pulleys 102 and 103, respectively, and feeds a pressure-sensitive adhesive strip 100 by contact with its adhesive underside. The belt 101 is driven longitudinally in a closed path within a longitudinally extending guide track 104 which extends rearwardly of the axis of the first pulley 102 and beyond the pulley 103 and the belt 101 at the front end of the device.

The pulleys 102 and 103 and the guide track 104 both are mounted in a pair of U-shaped mounting brackets 105 and 106 which, in turn, are secured to the underside of a horizontal extension 107 of a fixed housing wall 108 of the device by mounting bolts 109 and 110. The guide track 104 is in the form of a C or U-shaped curved plate or pipe section with its concave side facing the feeding belt 101 and contacting the non-adhesive side of the strip 100 passing over the belt. The guide track 104 is welded to the underside of the U-shaped mounting brackets 105 and 106. Another element of the feeding device is the spring presser foot 111 fastened at one end to the U-shaped mounting bracket 106 by the bolt 110 and bent downwardly at the other end to form a flat pressing section 112 for urging the adhesive side of the strip 100 into contact with the feeding belt 101, as shown most clearly in FIGS. 8, 11 and 13. A rectangular opening 113 is formed in the guide track 104 between the U-shaped brackets 105 and 106, as shown most clearly in FIGS. 8, 9 and 13, for receiving the pressing section 112 of the spring presser foot.

The feeding pulleys 102 and 103 are mounted on first and second feeding shafts 114 and 115, respectively, which pass through bushings 116 extending between the vertical arms of the U-shaped brackets 105 and 106 and the pulleys, themselves. The shaft 114 of the first pulley 102 is driven through a slip clutch in a manner which will be described more fully hereinafter, whereas the shaft 115 of the second pulley 103 merely idles. The pulleys 102 and 103 each comprise a pair of spaced peripheral flanges 117 which define a shallow groove 118 between them for receiving the belt 101 as it passes around the pulleys and the belt protrudes radially outward well beyond the flanges 117 on both pulleys 102 and 103. The outer diameters of the pulley grooves 118 are such and the pulley shafts 114 and 115 are so located that the outer surface of the feeding belt 101 normally would ride in resilient contact with the under surface of the pressing section 112 of the presser foot adjacent the underside of the top of the guide track 104, if the strip 100 were not present between the belt 101 and the pressing section 112. As mentioned hereinbefore, the guide track 104, itself, possesses a curved concave inner surface and presents side guide portions 121 located transversely outwardly of the feeding belt 101 and displaced in the direction of the belt away from the normal plane of contact between the strip 100 and the outer surface of the belt 101. More specifically, as shown most clearly in FIGS. 10 and 11, the inside surface of the guide track 104 is shaped in the form of a semi-circle and the track presents inwardly extending flanges or rails 122 at its lower extremities for guiding the longitudinal edges of the strip 100. From these figures, it will be seen that the outer feeding surface of the belt 101 runs in contact with the adhesive underside of the strip 100 from the point where the belt first contacts the strip almost directly in line with the axis of the first pulley 102 to the point where the belt 101 is separated from the strip 100 at a point approximately aligned with the axis of the second pulley 103. Since the belt 101 possesses a relatively small circular cross-section, the contact area between the belt and the underside of the strip at any point in its travel is relatively narrow, as shown most clearly in FIGS. 10 and 11. Thus, the belt 101 normally is in driving contact with the strip 100 only in a relatively narrow longitudinal contact area extending approximately along the longitudinal center line of the strip between the pulleys 102 and 103. This longitudinal contact area acts as an axis about which the strip 100 is shaped by virtue of its simultaneous contact with the belt 101 and the opposed side guide portions 121 of the track which include the edge guides or rails 122. These rails 122 also may perform a stripping function which assures that the belt 101 separates cleanly from the underside of the strip 100 as the strip is advanced from the feeding device, as will be described more fully hereinafter.

As mentioned hereinbefore, the pressure-sensitive adhesive strip 100 is advanced toward the feeding belt 101 by pulling means positioned ahead of the belt. This pulling means comprises a first pulling roll 123, a second similar roll 124 spaced therefrom, and a set of three continuous pulling belts 125 passing around the first and second rolls 123 and 124. The first pulling roll 123 is mounted for rotation on a corresponding fixed shaft 126 extending cantilever fashion from the fixed housing wall 108, and the second pulling roll 124 is mounted for rotation on a stub shaft 127 which also extends cantilever fashion from the fixed housing wall 108. Each of the three pulling belts 125 is a continuous resilient belt similar to the feeding belt 101 and also is circular in cross-section. The first pulling roll 123 presents a series of four spaced annular ridges 128 which define between them a set of three annular grooves 129 for receiving the three pulling belts 125. The belts 125 are recessed in the grooves 129 in such a way that the ridges 128 contact the adhesive surface of the strip 100 as the strip passes over the roll 123. The second roll 124 presents a similar series of four spaced ridges 131 defining between them a corresponding set of three grooves 132 for receiving the belts 125 as the belts pass around the roll 124. The adhesive strip 100 is led around a pulling portion of the first pulling roll 123 and then into contact with the belts 125 as the strip passes between the first and second pulling rolls 123 and 124. The ridges 131 on the second pull roll 127 protrude slightly beyond the belts 125 so that the adhesive surface of the strip 100 is in contact with these ridges 131 as the strip leaves the pulling means. The circumferential surfaces of the ridges 128 and 131 are transversely serrated, or knurled, to provide the desired pulling surfaces, as shown in FIG. 9. The strip 100 then is withdrawn from the pulling means by the slight tension applied to it by the feeding belt 101.

The feeding means and the pulling means described above both are driven from a main drive gear 133 mounted on a drive shaft 134 extending through the fixed housing wall 108. The main drive shaft 134 is driven counterclockwise, in FIG. 8, by an electric motor or a similar driving device, not shown, which may be controlled in a conventional manner either automatically or by an operator.

The main drive gear 133 drives the pulling means through a first idler gear 135 mounted on an idler shaft 136 fixed to the housing wall 108. The idler gear 135 transmits the driving force to a spur gear 137 fixed to the first pulley of the pulley means, as shown most clearly in FIGS. 8 and 9.

The feeding means is driven in like manner from the main driving gear 133 through a second idler gear 138 mounted on a corresponding second idler shaft 139 which also is fixed to the housing wall 108. This second idler gear 138, in turn, drives a spur gear 140 mounted for rotation on the first feeding shaft 114 of the feeding means. The spur gear 140 of the feeding means is somewhat smaller than the corresponding spur gear 137 of the pulling means so that the first pulley 102 of the feeding means would be rotated at a somewhat greater angular speed than the first roll 123 of the pulling means if the spur gear 140 were fixed to the first feeding shaft 114 of the pulling means. Even though the diameter of the first feeding pulley 102 is somewhat less than that of the first roll 123 of the pulling means, this would result in the linear speed of the outer surface of the feeding belt 101 being somewhat greater than the linear speed of the outer surface of the ridges 128 and 131 on the first and second pulling rolls 123 and 124. However, the spur gear 140 is part of an adjustable slip clutch mechanism which transmits only enough driving force to the first feeding pulley 102 to cause it to take any slack out of the strip 100 where it passes between the pulling means and the feeding means and apply only a limited amount of tension to this portion of the strip. Thereafter, the linear speed of the outer surface of the feeding belt 101 and the outer surface of the pulling rolls 123 and 124 remain approximately the same unless and until something happens to cause the strip 100 to become slack between the pulling means and the feeding means. If this happens, the feeding means will be driven at a greater linear speed than the pulling means, as described immediately above, until the slack is removed from the strip between the feeding means and the pulling means and thereafter at approximately the same linear speed.

As will be seen most clearly from FIGS. 9 and 12, the slip clutch which drives the first feeding pulley 102 through the first feeding shaft 114, in addition to the spur gear 140, comprises a torque collar 141 fixed to the feeding shaft 114 between the mounting bracket 105 and the spur gear 140, a friction ring 142 located on the shaft between the collar 141 and the spur gear 140 and a spring loading device on the other side of the spur gear. The spring loading device comprises a compression spring 143 fitted over the shaft between two washers 144, one of which presses against the hub of the spur gear 140 and the other against an adjustable nut 145 which may be moved in and out on the shaft by turning it to the desired position on threads provided for this purpose. By this means, the loading of the spring 143 may be adjusted to vary the frictional engagement between the rotatably mounted spur gear 140 and the fixed torque collar 141 through the friction ring 142 located between them. Thus, the tension in the strip 100 between the pulling means and the feeding means may by adjusted simply by turning the nut 145 on the feeding shaft 114 to vary the frictional engagement between the spur gear 140 and the collar 141 and thus affect the driving force imparted to the first feeding pulley 102.

In operation, the strip 100, which may be a conventional pressure-sensitive adhesive tape, is led from a tape supply, not shown, up over the first pulling roll 123 and thence over the pulling means to the feeding means. The leading end of the strip 100 is inserted into the space between the feeding belt 101 and the underside of the concave guiding surface of the track 104. A turned out portion or bell mouth 146 is provided at the rear end of the track 104 to aid in receiving the leading end of the strip and positioning it properly in the track in contact with the feeding belt 101. As shown most clearly in FIGS. 10 and 11, the strip 100 is centered in the track 104 and retained in this position by the side guide portions 121 and the guide rails 122 at each edge of the track. As explained hereinbefore, the pressing section 112 of the resilient presser foot exerts a force downwardly upon the top surface of the strip and presses the adhesive under-surface of the strip into contact with the belt 101, as shown most clearly in FIGS. 8 and 11. Thus, the strip 100 normally is distorted somewhat from the concave arcuate shape of the track itself, as shown in FIG. 11, at least for so long as it is in contact with the presser foot 112. As indicated hereinbefore, the outer surface of the feeding belt 101 is in driving contact with only a relatively narrow longitudinal area of the adhesive side of the strip extending roughly between the pulleys 102 and 103. As shown in FIGS. 10 and 11, at any given point in the longitudinal travel of the strip 100 together with the feeding belt 101, there is hardly more than point contact between the outer surface of the belt and the underside of the strip. This means that the belt can be separated quite easily from the adhesive surface of the strip merely by passing the belt around the second pulley 103 and thus out of the normal plane of contact between the belt and the strip, provided that the strip is maintained in sufficiently rigid form in the track 104 to prevent its remaining adhered to the belt 101 and following it around the pulley 103.

As explained hereinbefore, the track 104 extends longitudinally well beyond the second pulley 103 of the feeding means and beyond the feeding belt 101, itself, and remains in guiding relation with the strip 100 until the strip leaves the forward end of the track. Thus, the strip is retained in its concave arcuate configuration, such as is shown clearly in FIG. 10, as the belt is separated from the strip. If the strip 100 starts to follow the belt 101 as the belt begins to pass around the pulley 103, its longitudinal edges will be pulled into contact with the edge guides or rails 122 at the sides of the track and the strip will be prevented from being displaced any further in other than a longitudinal direction with respect to the track 104. As a result, the belt 101 is separated from the strip 100 easily without retarding the forward movement it imparts to the strip and without the necessity for applying tension to the strip ahead of the feeding means. The strip 100 then is fed from the forward end of the track 104 in cantilever fashion by virtue of the rigidity imparted to the strip by its concave arcuate three dimensional cross-section. When the leading end of the strip 100 has reached the desired position, the length necessary may be severed from the strip by a knife, not shown, or any other tape severing device or means which is suitable for the intended purpose.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A feeding device for a pressure-sensitive adhesive strip which comprises forwardly advancing feeding means adapted to progressively adhere to a narrow elongated area of the adhesive side of said strip and thereby advance said strip with said feeding means, said elongated area extending lengthwise of the strip for an appreciable distance along a longitudinal axis of contact centrally located transversely of the strip, a guide track extending longitudinally of said strip for guiding the strip as it adheres to said feeding means, said feeding means running within said track and said track comprising opposed edge guide portions located transversely outwardly of said feeding means for guiding the longitudinal edges of the strip on each side of said feeding means, said edge guide portions being displaced in the direction of said feeding means away from the normal plane of the strip passing through said axis of contact for causing the strip to assume a three dimensional transverse cross-section while said strip is adhered to said feeding means along said axis of contact, and stripping means for progressively separating said strip from said feeding means without adhering to or applying tension to the strip and without retarding the forward movement imparted to the strip by the feeding means; whereby said strip is progressively fed forward by said feeding means while adhering to said feeding means only in a narrow area of the adhesive side of the strip, caused to assume a three dimensional transverse cross-section by virtue of its simultaneous contact with said feeding means and the opposed edge guide portions of said track, and progressively separated from said feeding means by said stripping means.

2. A feeding device according to claim 1, wherein the feeding means comprises a continuous belt driven longitudinally in a closed path and said belt presents a narrow longitudinal area of contact to the adhesive side of said strip.

3. A feeding device according to claim 2, wherein said belt is circular in cross-section.

4. A feeding device according to claim 1, wherein said guide track comprises a guiding surface facing said feeding means and said guiding surface is concavely shaped transversely of the feeding means and substantially symmetrical with respect to the longitudinal center line of the strip.

5. A feeding device according to claim 1, which further comprises means for pressing the adhesive side of the pressure-sensitive adhesive strip into adhering contact with the feeding means and said track is recessed to accommodate said pressing means.

6. A feeding device according to claim 1, which further comprises pulling means in the path of the strip ahead of said feeding means and means responsive to the tension applied to the strip between said pulling means and said feeding means for driving said pulling means to advance the strip toward said feeding means.

7. A feeding device according to claim 6, wherein said pulling means advances said strip at the same linear speed as the outer surface of said feeding means when a given tension is applied to the strip between said pulling means and said feeding means.

8. A feeding device according to claim 1, which further comprises pulling means in the path of the strip ahead of said feeding means for advancing said strip toward said feeding means at substantially the same liner speed as that of the outer surface of said feeding means.

9. A feeding device for a pressure-sensitive adhesive strip which comprises a continuous belt driven longitudinally in a closed path, said belt presenting a narrow longitudinal line of contact to the adhesive side of said strip and being adapted to progressively adhere to said strip along said longitudinal line of contact and move the strip along with the belt when an adhesive side of the strip is brought into adhering contact with the belt along said line, a guide track extending longitudinally of the belt for guiding the strip as it leaves the belt, said track comprising a guiding surface facing the belt and said guiding surface being concavely shaped transversely of the belt and substantially symmetrical with respect to the longitudinal centerline of the belt, said belt running within said track so that the strip is in contact with said guiding surface while it is adhered to said belt and thereby is caused to assume a concave cross-section before it is separated from the belt, and stripping means for progressively separating said strip from said belt without adhering to or applying tension to the strip and without retarding the forward movement imparted to the strip by the belt.

10. A feeding device for a pressure-sensitive adhesive strip which comprises forwardly moving feeding means adapted to progressively adhere lightly to the adhesive side of said strip along the outer surface of said feeding means, a guide track extending longitudinally of said strip for guiding the strip as it adheres to said feeding means, said feeding means running within said track and said track comprising opposed edge guide portions for guiding the longitudinal edges of the strip on each side of said feeding means, said edge guide portions being displaced in the direction of said feeding means away from the normal plane of contact between the strip and the outer surface of said feeding means for causing the strip to assume a three dimensional transverse cross-section while said strip is adhered to said feeding means along the outer surface of the feeding means, pulling means in the path of the strip ahead of said feeding means for normally advancing said strip toward said feeding means at substantially the same linear speed as that of the outer surface of said feeding means, and stripping means for progressively separating said strip from said feeding means without adhering to or applying tension to the strip and without retarding the forward movement imparted to the strip by the feeding means; whereby said strip is advanced toward said feeding means at minimum tension, progressively fed forward by said feeding means while adhering only lightly thereto and caused to assume a three dimensional transverse cross-section by virtue of its simultaneous contact with said feeding means and the opposed edge guide portions of said track, and progressively separated from said feeding means by said stripping means.

11. A feeding device for a pressure-sensitive adhesive strip which comprises a first pulley, a second pulley spaced from said first pulley, a continuous belt passing around said first and second pulleys, each of said pulleys presenting spaced annular flanges defining an annular groove between them for receiving said belt, said belt protruding radially outwardly beyond the flanges of said first pulley and the flanges of said second pulley protruding radially outwardly beyond said belt as the belt passes around said pulleys, means for pressing an adhesive side of a pressure-sensitive adhesive strip into adhering contact with the belt as it passes around said first pulley, said belt presenting a narrow contact area to said strip, said second pulley being adapted to rotate with said belt in such a way that the perimeters of the flanges of said second pulley have a linear speed at least as great as that of the outer surface of the belt, whereby said second pulley will separate the strip from the belt and the strip will be fed forward by the force imparted to it by said belt, a guide track extending longitudinally of the belt for guiding the strip as it leaves the belt, said track comprising a guiding surface facing the belt and a pair of side rails also facing the belt and extending along opposite sides of the track, said guiding surface being concavely curved transversely of the belt and substantially symmetrical with respect to the longitudinal centerline of the belt, said belt running within said track so that the strip is in contact with said guiding surface while it is adhered to said belt and thereby is caused to assume a curved concave cross-section before it is separated from the belt, said side rails extending inwardly of the guiding surface and being spaced to accommodate the strip when the strip is shaped by said guiding surface, and first driving means for rotatably driving one of said first and second pulleys, pulling means in the path of the strip ahead of said belt, means responsive to the tension applied to the strip between said pulling means and said belt for driving said pulling means to advance the strip toward said belt, control means for stopping and starting said first driving means, and a knife operable when said first driving means has stopped for cutting a portion of said strip fed beyond said second pulley, said track being recessed to receive said knife and allow the knife to cut through the strip while the strip is supported by the track.

12. A feeding device for a pressure-sensitive adhesive strip which comprises forwardly advancing feeding means adapted to progressively adhere to a narrow elongated area of the adhesive side of said strip and thereby advance said strip with said feeding means, said elongated area extending lengthwise of the strip for an appreciable distance along a longitudinal axis of contact centrally located transversely of the strip, and a guide track extending longitudinally of said strip for guiding the strip as it adheres to said feeding means, said feeding means running within said track and said track comprising opposed side guide portions located transversely outwardly of said feeding means for guiding the strip on each side of said feeding means, said side guide portions being displaced in the direction of said feeding means away from the normal plane of contact between the strip and the feeding means for causing the strip to assume a three dimensional transverse cross-section while said strip is adhered to said feeding means along said axis of contact; whereby said strip is progressively fed forward by said feeding means while adhering to said feeding means only in a narrow area of the adhesive side of the strip and simultaneously caused to assume a three dimensional transverse cross-section.

13. A feeding device according to claim 12, wherein the feeding means comprises a continuous belt driven longitudinally in a closed path and said belt presents a narrow longitudinal contact area to the adhesive side of said strip.

14. A feeding device according to claim 12, wherein said guide track comprises guiding surface portions facing said feeding means and said guiding surface portions are concavely shaped transversely of the feeding means and substantially symmetrical with respect to the longitudinal centerline of the strip.

15. A feeding device according to claim 13, wherein said side guide portions comprise edge guides for guiding the longitudinal edges of the strip.

16. A feeding device according to claim 15, wherein said edge guides retain the edges of said strip against other than longitudinal displacement from the track, thereby assuring that the strip retains its three dimensional transverse cross-section as long as it is guided by said track.

17. A feeding device for a pressure-sensitive adhesive strip which comprises forwardly moving feeding means adapted to progressively adhere lightly to the adhesive side of said strip along the outer surface of said feeding means, a guide track extending longitudinally of said strip for guiding the strip as it adheres to said feeding means, said feeding means running within said track and said track comprising opposed side guide portions for guiding the strip on each side of said feeding means, said side guide portions being displaced in the direction of said feeding means away from the normal plane of contact between the strip and the outer surface of said feeding means for causing the strip to assume a three dimensional transverse cross-section while said strip is adhered to said feeding means along the outer surface of the feeding means, pulling means in the path of the strip ahead of said feeding means for normally advancing said strip toward said feeding means at substantially the same linear speed as that of the outer surface of said feeding means, and means for regulating the relative linear speed of said feeding means with respect to said pulling means for taking up any slack in said strip between the feeding means and the pulling means while applying only a limited tension to the strip between said feeding means and said pulling means; whereby said strip is advanced toward said feeding means at minimum tension, progressively fed forward by said feeding means while adhering only lightly thereto and simultaneously caused to assume a three dimensional transverse cross-section.

18. A feeding device according to claim 17, wherein said regulating means is responsive to the tension in said strip between said feeding means and said pulling means for driving the outer surface of said feeding means at a higher linear speed than the outer surface of said pulling means when the strip becomes slack between said feeding means and said pulling means and at the same linear speed as that of the outer surface of said pulling means when said slack is taken up.

19. A feeding device according to claim 17, wherein said regulating means is responsive to the tension in said strip between said feeding means and said pulling means for driving the outer surface of said pulling means at a lower linear speed than the outer surface of said feeding means when the strip becomes slack between said feeding means and said pulling means and at the same linear speed as that of the outer surface of said feeding means when said slack is taken up.

20. A feeding device for a pressure-sensitive adhesive strip which comprises forwardly advancing feeding means adapted to progressively adhere to a narrow elongated area of the adhesive side of said strip and thereby advance said strip with said feeding means, said elongated area extending lengthwise of the strip for an appreciable distance along a longitudinal axis of contact centrally located transversely of the strip, a guide track extending longitudinally of said strip for guiding the strip as it adheres to said feeding means, said feeding means running within said track and said track comprising opposed side guide portions located transversely outwardly of said feeding means for guiding the strip on each side of said feeding means, said side guide portions being displaced in the direction of said feeding means away from the normal plane of contact between the strip and the feeding means for causing the strip to assume a three dimensional transverse cross-section while said strip is adhered to said feeding means along said axis of contact, pulling means in the path of the strip ahead of said feeding means, and means for regulating the relative linear speed of said feeding means with respect to said pulling means for taking up any slack in said strip between the feeding means and the pulling means while applying only a limited tension to the strip between said feeding means and said pulling means; whereby said strip is progressively fed forward by said feeding means while adhering to said feeding means only in a narrow area of the adhesive side of the strip and simultaneously caused to assume a three dimensional transverse cross-section.

References Cited

UNITED STATES PATENTS

| | | | |
|---|---|---|---|
| 2,382,406 | 8/1945 | Engberg | 226—96 X |
| 2,720,262 | 10/1955 | Hanson | 226—96 X |
| 2,769,633 | 11/1956 | Krueger | 226—96 |
| 3,049,276 | 8/1962 | Wilkins | 226—111 X |
| 3,122,955 | 3/1964 | Eisenman | 83—922 X |

M. HENSON WOOD, Jr., *Primary Examiner.*

ALLEN N. KNOWLES, *Examiner.*